(12) United States Patent
Haag et al.

(10) Patent No.: US 11,012,375 B2
(45) Date of Patent: May 18, 2021

(54) ENHANCED HANDLING OF MULTICAST DATA STREAMS WITHIN A BROADBAND ACCESS NETWORK OF A TELECOMMUNICATIONS NETWORK

(71) Applicant: DEUTSCHE TELEKOM AG, Bonn (DE)

(72) Inventors: Thomas Haag, Rodgau (DE); Carsten Michel, Hochheim (DE); Hans-Joerg Kolbe, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 35 days.

(21) Appl. No.: 16/605,821

(22) PCT Filed: Apr. 16, 2018

(86) PCT No.: PCT/EP2018/059690
§ 371 (c)(1),
(2) Date: Oct. 17, 2019

(87) PCT Pub. No.: WO2018/192884
PCT Pub. Date: Oct. 25, 2018

(65) Prior Publication Data
US 2020/0053023 A1    Feb. 13, 2020

(30) Foreign Application Priority Data

Apr. 18, 2017  (EP) .................... 17166949

(51) Int. Cl.
*H04L 12/54*  (2013.01)
*H04L 12/931*  (2013.01)
(Continued)

(52) U.S. Cl.
CPC .......... *H04L 49/201* (2013.01); *H04L 12/185* (2013.01); *H04L 12/2859* (2013.01);
(Continued)

(58) Field of Classification Search
CPC . H04L 49/201; H04L 49/1523; H04L 49/254; H04L 12/185; H04L 12/2859;
(Continued)

(56) References Cited

U.S. PATENT DOCUMENTS

| 6,553,028 | B1 |   | 4/2003 | Cai et al. |
| 7,269,182 | B1 | * | 9/2007 | Carrel ................. H04L 12/1836 |
| | | | | 370/390 |

(Continued)

FOREIGN PATENT DOCUMENTS

WO    WO-2008093208 A1 *  8/2008    ......... H04L 65/4076

OTHER PUBLICATIONS

Coras A Cabellos-Aparicio J Domingo-Pascual Technical University of Catalonia F Maino Cisco Systems D Farinacci Lispers Net F: "LISP Replication Engineering; draft-coras-lisp-08.txt," (Nov. 2, 2015): 1-13 (XP015109555).

*Primary Examiner* — Curtis A Alia
(74) *Attorney, Agent, or Firm* — Leydig, Voit & Mayer, Ltd.

(57) ABSTRACT

A method for handling of multicast data streams within a broadband access network of a telecommunications network includes: a specific service edge node receiving a join request message from or through a specific customer premises equipment; an activation request message being transmitted, by the specific service edge node, to a multicast controller node within the broadband access network; and the multicast controller node generating and/or replicating multicast data stream-related data packets and injecting these multicast data stream-related data packets, using a corresponding session identifier information, into a point-to-point-protocol connection or tunneling protocol connection between the specific service edge node and the specific customer premises equipment.

14 Claims, 2 Drawing Sheets

(51) Int. Cl.
*H04L 12/18* (2006.01)
*H04L 12/28* (2006.01)
*H04L 12/66* (2006.01)
*H04L 12/933* (2013.01)
*H04L 12/937* (2013.01)
*H04L 12/70* (2013.01)

(52) U.S. Cl.
CPC .......... *H04L 12/5601* (2013.01); *H04L 12/66* (2013.01); *H04L 49/1523* (2013.01); *H04L 49/254* (2013.01); *H04L 2012/5641* (2013.01)

(58) Field of Classification Search
CPC ................ H04L 12/5601; H04L 12/66; H04L 2012/5641
See application file for complete search history.

(56) References Cited

U.S. PATENT DOCUMENTS

| | | | |
|---|---|---|---|
| 7,701,938 B1* | 4/2010 | Bernstein | H04L 47/10 370/390 |
| 2006/0187950 A1* | 8/2006 | Bou-Diab | H04L 12/185 370/432 |
| 2007/0002858 A1* | 1/2007 | Bichot | H04L 45/16 370/390 |
| 2011/0075572 A1* | 3/2011 | Serbest | H04L 12/18 370/248 |
| 2016/0269324 A1 | 9/2016 | Banavalikar | |

* cited by examiner

ENHANCED HANDLING OF MULTICAST DATA STREAMS WITHIN A BROADBAND ACCESS NETWORK OF A TELECOMMUNICATIONS NETWORK

CROSS-REFERENCE TO PRIOR APPLICATIONS

This application is a U.S. National Phase Application under 35 U.S.C. § 371 of International Application No. PCT/EP2018/059690, filed on Apr. 16, 2018, and claims benefit to European Patent Application No. EP 17166949.2, filed on Apr. 18, 2017. The International Application was published in English on Oct. 25, 2018 as WO 2018/192884 A1 under PCT Article 21(2).

FIELD

The present invention relates a method for enhanced handling of multicast data streams within a broadband access network of a telecommunications network, wherein the broadband access network comprises a plurality of service edge nodes to be connected to customer premises equipments, the customer premises equipments being provided to be connected to the broadband access network for handling both unicast traffic and multicast data streams between the customer premises equipments and the broadband access network.

Furthermore, the present invention relates to a telecommunications network for enhanced handling of multicast data streams within a broadband access network of the telecommunications network, wherein the broadband access network comprises a plurality of service edge nodes to be connected to customer premises equipments, the customer premises equipments being provided to be connected to the broadband access network for handling both unicast traffic and multicast data streams between the customer premises equipments and the broadband access network.

Additionally, the present invention relates to a system for enhanced handling of multicast data streams within a broadband access network of a telecommunications network, wherein the broadband access network comprises a plurality of service edge nodes to be connected to customer premises equipments, the customer premises equipments being provided to be connected to the broadband access network for handling both unicast traffic and multicast data streams between the customer premises equipments and the broadband access network.

Furthermore, the present invention relates to a program and a computer program product for enhanced handling of multicast data streams within a broadband access network of a telecommunications network.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

The present invention generally relates to the area of providing the possibility to efficiently realize the transmission of multicast data streams, i.e. comprising multicast data stream-related data packets, to a plurality of recipients or client devices, typically via customer premises equipments being connected to such recipients. Typically, such client devices use a network connectivity link provided by the customer premises equipment that connects the client device to a broadband access network of a telecommunications network, typically using a central office point of delivery of the telecommunications network.

In conventionally known broadband access networks, multicast control signaling and data plane replication is typically done at the same point in a device or a network node. For example, the multicast data stream might be transmitted within the same point-to-point-protocol connection between the customer premises equipment and the terminating broadband network gateway (BNG) or service edge node (for that customer or subscriber) that is also used for non-multicast, i.e. unicast, data.

In such a scenario, the request to deliver multicast packets is received by the terminating broadband network gateway or the service edge node through the point-to-point-protocol session, and the broadband network gateway or the service edge node performs the multicast replication itself.

However, as the multicast data plane traffic has to be handled by the broadband network gateway or the service edge node, this approach requires complex quality-of-service mechanisms to differentiate between multicast and unicast traffic—especially as multiple multicast streams might be delivered to the same subscriber at the same time.

SUMMARY

In an exemplary embodiment, the present invention provides a method for handling of multicast data streams within a broadband access network of a telecommunications network. The broadband access network comprises a plurality of service edge nodes to be connected to customer premises equipments, the customer premises equipments being provided to be connected to the broadband access network for handling both unicast traffic and multicast data streams between the customer premises equipments and the broadband access network. For transmitting unicast traffic-related data packets between a specific service edge node and a specific customer premises equipment, a point-to-point-protocol connection or a tunneling protocol connection is established between the specific service edge node and the specific customer premises equipment, the point-to-point-protocol connection or the tunneling protocol connection having an assigned session identifier information. In case that a multicast data stream, comprising multicast data stream-related data packets, is to be transmitted to the specific customer premises equipment, the method comprises: in a first step, the specific service edge node receives a join request message from or through the specific customer premises equipment; in a second step subsequent to the first step, an activation request message is transmitted, by the specific service edge node, to a multicast controller node within the broadband access network, wherein via the activation request message, at least part of the join request message is forwarded to the multicast controller node together with the session identifier information of the point-to-point-protocol connection or the tunneling protocol connection between the specific service edge node and the specific customer premises equipment; and in a third step subsequent to the second step, the multicast controller node generates and/or replicates the multicast data stream-related data packets and injects these multicast data stream-related data packets, using the corresponding session identifier information, into the point-to-point-protocol connection or the tunneling protocol connection between the specific service edge node and the specific customer premises equipment.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
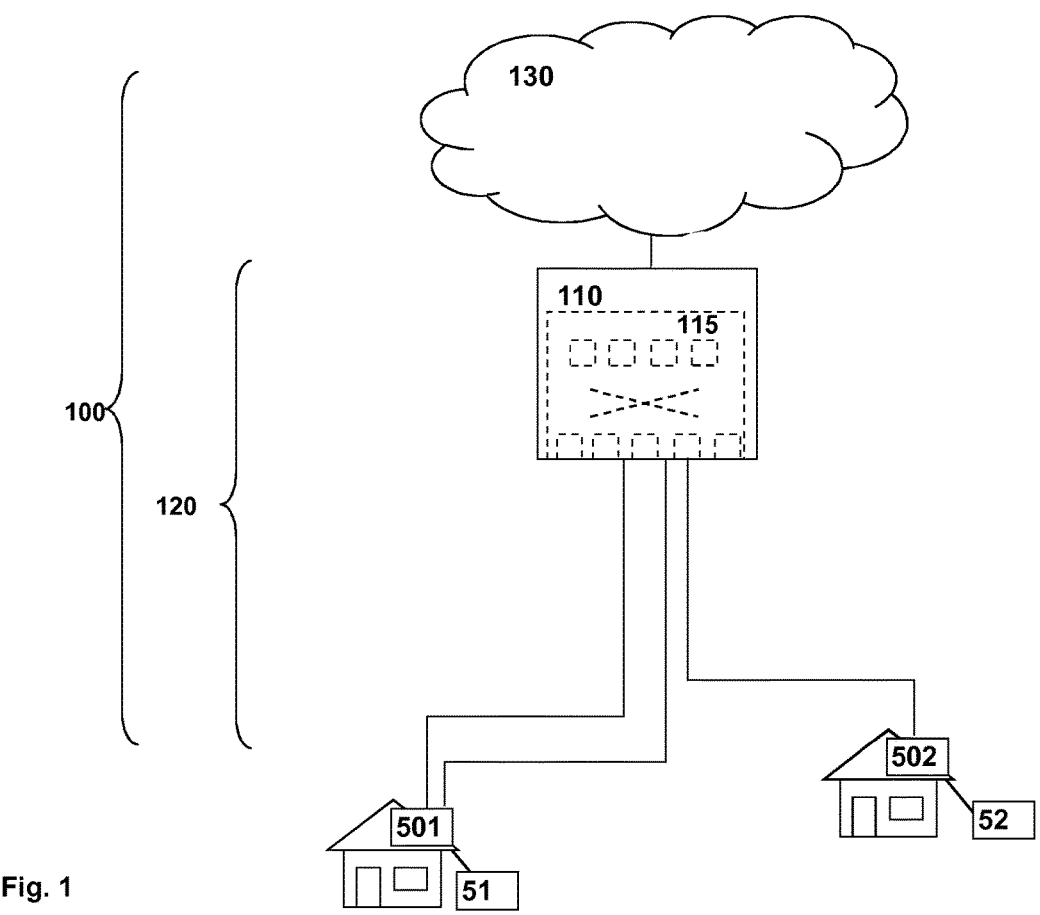
FIG. 1 schematically illustrates a telecommunications network according to the present invention, wherein the telecommunications network comprises a broadband access network, and a logical or physical central office point of delivery (being part of the broadband access network).

Exemplary embodiments of the present invention provide a technically simple, effective and cost-effective solution for enhanced handling of multicast data streams within a broadband access network of a telecommunications network. Exemplary embodiments of the present invention further provide a corresponding telecommunications network, and a corresponding system comprising a telecommunications network.

In an exemplary embodiment, the present invention provides a method for enhanced handling of multicast data streams within a broadband access network of a telecommunications network, wherein the broadband access network comprises a plurality of service edge nodes to be connected to customer premises equipments, the customer premises equipments being provided to be connected to the broadband access network for handling both unicast traffic and multicast data streams between the customer premises equipments and the broadband access network,
wherein, for transmitting unicast traffic-related data packets between a specific service edge node and a specific customer premises equipment, a point-to-point-protocol connection or a tunneling protocol connection is established between the specific service edge node and the specific customer premises equipment, the point-to-point-protocol connection or the tunneling protocol connection having assigned a session identifier information, wherein—in case that a multicast data stream, comprising multicast data stream-related data packets, is to be transmitted to the specific customer premises equipment—the method comprises the following steps:

in a first step, the specific service edge node receives a join request message from or through the specific customer premises equipment, in a second step subsequent to the first step, an activation request message is transmitted, by the specific service edge node, to a multicast controller node within the broadband access network, wherein via the activation request message, at least part of the join request message is forwarded to the multicast controller node together with the session identifier information of the point-to-point-protocol connection or the tunneling protocol connection being established between the specific service edge node and the specific customer premises equipment, in a third step subsequent to the second step, the multicast controller node generates and/or replicates the multicast data stream-related data packets and injects these multicast data stream-related data packets, using the corresponding session identifier information, into the existing point-to-point-protocol connection or the tunneling protocol connection between the specific service edge node and the specific customer premises equipment.

Another aspect of the present invention provides a method for enhanced handling of multicast data streams within a broadband access network of a telecommunications network, wherein the broadband access network comprises a plurality of service edge nodes to be connected to customer premises equipments, the customer premises equipments being provided to be connected to the broadband access network in view of handling both unicast traffic and multicast data streams between the customer premises equipments and the broadband access network,
wherein, in view of transmitting unicast traffic-related data packets between a specific service edge node and a specific customer premises equipment, a point-to-point-protocol connection or a tunneling protocol connection is established between the specific service edge node and the specific customer premises equipment, the point-to-point-protocol connection or the tunneling protocol connection having assigned a session identifier information, wherein—in case that a multicast data stream, comprising multicast data stream-related data packets, is to be transmitted to the specific customer premises equipment—the method comprises the following steps:

in a first step, the specific service edge node receives a join request message from or through the specific customer premises equipment, in a second step subsequent to the first step, an activation request message is transmitted, by the specific service edge node, to a multicast controller node within the broadband access network, wherein via the activation request message, at least part of the join request message is forwarded to the multicast controller node together with the session identifier information of the point-to-point-protocol connection or the tunneling protocol connection being established between the specific service edge node and the specific customer premises equipment, in a third step subsequent to the second step, the multicast controller node generates and/or replicates the multicast data stream-related data packets in view of injecting these multicast data stream-related data packets, using the corresponding session identifier information, into the existing point-to-point-protocol connection or the tunneling protocol connection between the specific service edge node and the specific customer premises equipment.

It is thereby advantageously possible according to the present invention to provide a method of disaggregation of the multicast control signaling and the user plane replication, i.e. to provide a separation of, on the one hand, the entity (or network node) that is used by broadband subscribers to request delivery of multicast packets (i.e. multicast data stream-related data packets), for instance through Internet Group Management Protocol (IGMP) signaling, and, on the other hand, the entity (or network node) that actually replicates such multicast packets, i.e. the multicast data stream-related data packets corresponding to the considered request. Hence, according to the present invention, it is advantageously possible to offload the multicast processing (e.g., the replication of the data plane) from the broadband network gateway node or the service edge node.

According to the present invention, it is advantageously possible to avoid splitting the handling of multicast data stream-related data packets, on the one hand, and unicast traffic-related data packets, on the other hand, via separated virtual local area networks (VLANs) between the customer premises equipment and the broadband access network, and thereby to provide two completely separated data paths. In such a scenario, requiring two virtual local area networks, the request to deliver multicast data stream-related data packets is received by a separate virtual local area network. Hence, it is possible to forward such a request to a separate device in order to handle the multicast signaling and replication; however, as the data paths of unicast and multicast traffic are completely separated, the quality-of-service framework of the service edge node or broadband network gateway node is not aware of the existence of multicast streams. Furthermore, the use of two virtual local area networks per broadband subscriber requires considerable efforts and might even result in scaling issues on the access nodes and/or on the service edge nodes.

The term "injection" refers to the process of feeding additional data streams into the point-to-point-protocol connection or the tunneling protocol connection. These connections usually span several intermediate nodes between the endpoints. Point-to-point-protocol encapsulation and de-encapsulation of data packets (or encapsulation and de-encapsulation using the tunneling protocol) takes place at the endpoints of the connection. Injecting data into the connection means inserting additional data packets and/or modifying existing packets at one of the intermediate nodes without de-encapsulation and re-encapsulation of the existing data stream. Preferably, the injection process is limited to insertion of multicast data stream-related data packets without modification of existing packets. This operation requires the utilization of the point-to-point-protocol session ID (or tunnel ID) at the injection point. In the context of the present invention the injection point is preferably located within the multicast controller node, which is an intermediate node in the path connecting the specific service edge node and the specific customer premises equipment (which are the endpoints of the point-to-point connection or tunneling protocol connection). Multicast control signaling, i.e. exchange of join request messages is carried out between the specific customer premises equipment and the specific service edge node. In this way it is advantageously possible to offload the multicast replication to the multicast controller node while keeping head-end and tail-end of the data path located at the specific service edge node and the specific customer premises equipment, thereby separating data plane replication and control signaling.

The present invention applies to broadband access network platforms such as in a fifth-generation mobile network (5G network) or CORD (Central Office Re-architected as a Data center). In these architectures multiple network termination ports are aggregated by an access node or a line termination node (e.g. an optical line termination (OLT) device) and interconnected to a subscriber termination device (e.g. a service edge node or a broadband network gateway node or device) via a layer-2 infrastructure such as a datacenter fabric. Hence, according to the present invention, it is advantageously possible to provide a fabric architecture within the central office point of delivery, which supports Layer 2 based access systems. These access systems are in turn connected to customer premises equipments of the respective customer or subscriber of the telecommunications network, and the customer premises equipments are typically connected to at least one client device. The client device can be any communication device such as a personal portable or desktop computing device, a (video or audio) streaming device, a television device, a smart phone, a tablet computing device, or any other device that is connectable either using a wireline or cable connection, or by using a wireless link such as a WLAN (wireless local area network) or WiFi connection, a Bluetooth connection or any other low range or cellular wireless access technology. The customer premises equipment according to the present invention is preferably also an integrated access device or is able to realize functionalities of an integrated access device.

The present invention assumes that a point-to-point-protocol connection (or a tunneling protocol connection) is established between a considered customer premises equipment (or specific customer premises equipment) and a node of the broadband access network (being called the specific service edge node), i.e. it is assumed that the point-to-point-protocol connection (or the tunneling protocol connection) is established between the specific service edge node and the specific customer premises equipment. Regarding unicast traffic-related data packets, this point-to-point-protocol connection (or this tunneling protocol connection) is used in a classical (and conventionally known) manner, i.e. the specific service edge node manages or administrates the point-to-point-protocol connection (or the tunneling protocol connection) regarding control signaling. The point-to-point-protocol connection (or the tunneling protocol connection) may have an assigned session identifier information. According to the present invention and in case that a multicast data stream—comprising multicast data stream-related data packets—is to be transmitted to the specific customer premises equipment, the specific service edge node receives a join request message from or through the specific customer premises equipment. In itself, the reception of the join request message also corresponds to a conventionally known handling of multicast data streams. However, according to the present invention—and typically subsequent to the reception, by the service edge node, of the join request message, in a second step—, an activation request message is transmitted, by the specific service edge node, to a multicast controller node within the broadband access network. The activation request message either is or corresponds to the join request message, or at least comprises at least part of the join request message, and the activation request message is forwarded to the multicast controller node together with the session identifier information of the point-to-point-protocol connection (or of the tunneling protocol connection) being established between the specific service edge node and the specific customer premises equipment. As a consequence thereof, the multicast controller node generates and/or replicates the multicast data stream-related data packets and injects these multicast data stream-related data packets—using the corresponding session identifier information—into the existing point-to-point-protocol connection (or the tunneling protocol connection) between the specific service edge node and the specific customer premises equipment. Hence, the task of generating and/or replicating the multicast data stream-related data packets is offloaded from the service edge node to the multicast controller node.

The telecommunications network according to the present invention might be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence (FMC) networks.

Furthermore, it is advantageously possible and preferred according to the present invention that between the unicast traffic of the specific customer premises equipment, on the one hand, and, the multicast data stream towards the specific customer premises equipment, on the other hand, a mapping of the multicast data stream-related data packets and the unicast traffic-related data packets is realized based on the session identifier information and/or wherein the multicast data stream-related data packets are injected into the existing point-to-point-protocol connection or the existing tunneling protocol connection at a multicast injection point, wherein the multicast injection point is preferably located within the multicast controller node.

Based on using a mapping of the multicast data stream-related data packets and the unicast traffic-related data packets based on the session identifier information, it is advantageously possible, according to the present invention, to align the unicast traffic with the multicast traffic directed to the specific customer premises equipment (or directed to a client device connected to the specific customer premises equipment in question).

Based on injecting the multicast data stream-related data packets into the existing point-to-point-protocol connection (or the existing tunneling protocol connection) at a multicast injection point, it is effectively possible to offload the replication handling of such multicast data stream-related data packets from the specific service edge node.

According to a further embodiment of the present invention, both the multicast data stream-related data packets and the unicast traffic-related data packets—while logically sharing the same point-to-point-protocol connection or the same tunneling protocol connection using only one virtual local area network—only partly share the same physical data path, and wherein preferably the multicast injection point is physically separated from the service edge node, acting as a forwarding point within the telecommunications network of the multicast traffic of or for the specific customer premises equipment.

Thereby, it is advantageously possible to effectively handle the multicast data stream-related data packets and to realize their offloading from the service edge node.

According to a further embodiment of the present invention, in order to perform traffic shaping of the unicast traffic-related data packets between the specific service edge node and the specific customer premises equipment, the multicast controller node provides an information regarding the bandwidth used by the multicast data stream to the specific service edge node.

Thereby, it is advantageously possible to align the transmission of the multicast data stream-related data packets with the unicast traffic-related data packets towards the specific customer premises equipment (and/or towards the client device connected to the specific customer premises equipment).

In case there is a need to change or repair a leaf switch or multicast controller node (due, e.g., to failure or other maintenance task), it is advantageously possible according to the present invention to transfer all different multicast streams handled by such a multicast controller node (i.e. the different multicast streams (if applicable) for one subscriber or customer (or customer premises equipment) or the different multicast streams for different customers or subscribers, i.e. for different customer premises equipments) to another network node that is taking over the functionality of multicast controller node.

According to further embodiments of the present invention, multicast replication of the multicast data stream-related data packets is carried out exclusively at the multicast controller node and transmission of native join messages or native join requests—such as join messages or join requests according to a protocol-independent multicast protocol—is exclusively carried out between the specific customer premises equipment and the specific service edge node.

According to further embodiments of the present invention, the specific service edge node avoids performing any multicast replication of the multicast data stream-related data packets and/or avoids transmitting such native join messages or such native join requests—such as join messages or join requests according to a protocol-independent multicast protocol—towards a network node of broadband access network.

Based on the specific service edge node avoiding transmission of native join messages or native join requests toward (e.g., hierarchically higher) network nodes of the broadband access network, it is advantageously possible to avoid the specific service edge node directly receiving the corresponding multicast data stream-related data packets (and, hence, needing to handle those data packets).

Furthermore, according to an embodiment of the present invention, the broadband access network comprises a switching fabric within a central office point of delivery, wherein the switching fabric comprises a plurality of spine network nodes and a plurality of leaf network nodes, wherein the multicast controller node corresponds to a leaf network node of the plurality of leaf network nodes wherein—within the switching fabric considered—each one of the plurality of spine network nodes is connected with each one of the plurality of leaf network nodes, and wherein the broadband access network preferably comprises a plurality of line termination nodes, wherein a specific line termination node is part of the point-to-point-protocol connection or the tunneling protocol connection being established between the specific service edge node and the specific customer premises equipment.

Thereby, it is advantageously possible to easily and effectively implement a method in accordance with an exemplary embodiment of the invention.

Furthermore, the present invention relates to a telecommunications network for enhanced handling of multicast data streams within a broadband access network of the telecommunications network, wherein the broadband access network comprises a plurality of service edge nodes to be connected to customer premises equipments, the customer premises equipments being provided to be connected to the broadband access network for handling both unicast traffic and multicast data streams between the customer premises equipments and the broadband access network, wherein, for transmitting unicast traffic-related data packets between a specific service edge node and a specific customer premises equipment, the telecommunication network is adapted to establish a point-to-point-protocol connection or a tunneling protocol connection between the specific service edge node and the specific customer premises equipment, the point-to-point-protocol connection or the tunneling protocol connection having assigned a session identifier information, wherein—in case that a multicast data stream, comprising multicast data stream-related data packets, is to be transmitted to the specific customer premises equipment—the telecommunications network is configured such that:

the specific service edge node is adapted to receive a join request message from the specific customer premises equipment, the specific service edge node is adapted to transmit an activation request message to a multicast controller node within the broadband access network, wherein via the activation request message, at least part of the join request message is forwarded to the multicast controller node together with the session identifier information of the point-to-point-protocol connection or the tunneling protocol connection being established between the specific service edge node and the specific customer premises equipment, the multicast controller node is adapted to generate and/or replicate the multicast data stream-related data packets and is adapted to inject these multicast data stream-related data packets, using the corresponding session identifier information, into the existing point-to-point-protocol connection or the tunneling protocol connection between the specific service edge node and the specific customer premises equipment.

The present invention also relates to a telecommunications network for enhanced handling of multicast data streams within a broadband access network of the telecommunications network, wherein the broadband access network comprises a plurality of service edge nodes to be connected to customer premises equipments, the customer premises equipments being provided to be connected to the broadband access network in view of handling both unicast traffic and multicast data streams between the customer premises equipments and the broadband access network, wherein, in view of transmitting unicast traffic-related data packets between a specific service edge node and a specific customer premises equipment, a point-to-point-protocol connection or a tunneling protocol connection is established between the specific service edge node and the specific customer premises equipment, the point-to-point-protocol connection or the tunneling protocol connection having assigned a session identifier information, wherein—in case that a multicast data stream, comprising multicast data stream-related data packets, is to be transmitted to the specific customer premises equipment—the telecommunications network is configured such that:

the specific service edge node receives a join request message from the specific customer premises equipment, an activation request message is transmitted, by the specific service edge node, to a multicast controller node within the broadband access network, wherein via the activation request message, at least part of the join request message is forwarded to the multicast controller node together with the session identifier information of the point-to-point-protocol connection or the tunneling protocol connection being established between the specific service edge node and the specific customer premises equipment, the multicast controller node generates and/or replicates the multicast data stream-related data packets in view of injecting these multicast data stream-related data packets, using the corresponding session identifier information, into the existing point-to-point-protocol connection or the tunneling protocol connection between the specific service edge node and the specific customer premises equipment.

Furthermore, the present invention relates to a system for enhanced handling of multicast data streams within a broadband access network of a telecommunications network, the system comprising the telecommunications network and a plurality of customer premises equipments, wherein the broadband access network comprises a plurality of service edge nodes to be connected to the customer premises equipments, the customer premises equipments being provided to be connected to the broadband access network for handling both unicast traffic and multicast data streams between the customer premises equipments and the broadband access network, wherein, for transmitting unicast traffic-related data packets between a specific service edge node and a specific customer premises equipment, the system is adapted to establish a point-to-point-protocol connection or a tunneling protocol connection between the specific service edge node and the specific customer premises equipment, the point-to-point-protocol connection or the tunneling protocol connection having assigned a session identifier information, wherein—in case that a multicast data stream, comprising multicast data stream-related data packets, is to be transmitted to the specific customer premises equipment—the system is configured such that:

the specific service edge node is adapted to receive a join request message from the specific customer premises equipment, the specific service edge node is adapted to transmit an activation request message to a multicast controller node within the broadband access network, wherein via the activation request message, at least part of the join request message is forwarded to the multicast controller node together with the session identifier information of the point-to-point-protocol connection or the tunneling protocol connection being established between the specific service edge node and the specific customer premises equipment, the multicast controller node is adapted to generate and/or replicate the multicast data stream-related data packets and is adapted to inject these multicast data stream-related data packets, using the corresponding session identifier information, into the existing point-to-point-protocol connection or the tunneling protocol connection between the specific service edge node and the specific customer premises equipment.

The present invention also relates to a system for enhanced handling of multicast data streams within a broadband access network of a telecommunications network, the system comprising the telecommunications network and a plurality of customer premises equipments, wherein the broadband access network comprises a plurality of service edge nodes to be connected to the customer premises equipments, the customer premises equipments being provided to be connected to the broadband access network in view of handling both unicast traffic and multicast data streams between the customer premises equipments and the broadband access network, wherein, in view of transmitting unicast traffic-related data packets between a specific service edge node and a specific customer premises equipment, a point-to-point-protocol connection or a tunneling protocol connection is established between the specific service edge node and the specific customer premises equipment, the point-to-point-protocol connection or the tunneling protocol connection having assigned a session identifier information, wherein—in case that a multicast data stream, comprising multicast data stream-related data packets, is to be transmitted to the specific customer premises equipment—the method comprises the following steps:

the specific service edge node receives a join request message from the specific customer premises equipment, an activation request message is transmitted, by the specific service edge node, to a multicast controller node within the broadband access network, wherein via the activation request message, at least part of the join request message is forwarded to the multicast controller node together with the session identifier information of the point-to-point-protocol connection or the tunneling protocol connection being established between the specific service edge node and the specific customer premises equipment, the multicast controller node generates and/or replicates the multicast data stream-related data packets in view of injecting these multicast data stream-related data packets, using the corresponding session identifier information, into the existing point-to-point-protocol connection or the tunneling protocol connection between the specific service edge node and the specific customer premises equipment.

Still additionally, the present invention relates to a program comprising a computer readable program code which, when executed on a computer and/or on a multicast controller node or on a network node of a switching fabric, such as within a central office point of delivery, or in part on the on a multicast controller node and in part on the network node of the switching fabric, causes the computer and/or the multicast controller node and/or the network node of the switching fabric to perform a method in accordance with an exemplary embodiment of the invention.

Furthermore, the present invention relates to a computer program product for enhanced handling of multicast data streams within a broadband access network of a telecommunications network, the computer program product comprising a computer program stored on a storage medium, the computer program comprising program code which, when executed on a computer and/or on a multicast controller node or on a network node of a switching fabric, such as within a central office point of delivery, or in part on the on a multicast controller node and in part on the network node of the switching fabric, causes the computer and/or the multicast controller node and/or the network node of the switching fabric to perform a method in accordance with an exemplary embodiment of the invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown. In the exemplary embodiment shown in FIG. 1, the telecommunications network has only a fixed line part. However, according to the present invention, also a telecommunications network 100 of the type having a fixed-line part and a mobile (or cellular) part, or a telecommunications network 100 of the "mobile (or cellular)-only" type is possible to be used according to the present invention. In the exemplary embodiment shown in FIG. 1, the telecommunications network 100 comprises the fixed line part to provide an access—using customer premises equipments (or integrated access devices) 501, 502—to client devices. The client devices are each connected to a corresponding customer premises equipment. In the exemplary embodiment shown in FIG. 1, a first client device 51 is connected to a first customer premises equipment 501, and a second client device 52 is connected to a second customer premises equipment 502. The telecommunications network 100 comprises at least one logical or physical central office point of delivery 110 that is preferably realized within a data center and that is handling different access requirements, or different access possibilities, of the client devices 51, 52 provided by the telecommunications network 100 or via the telecommunications network 100. The client devices 51, 52 are typically connected to the logical or physical central office point of delivery 110 via the customer premises equipments 501, 502 or via a customer premises equipment functionality that might be built in the client devices 51, 52.

Figure 2:
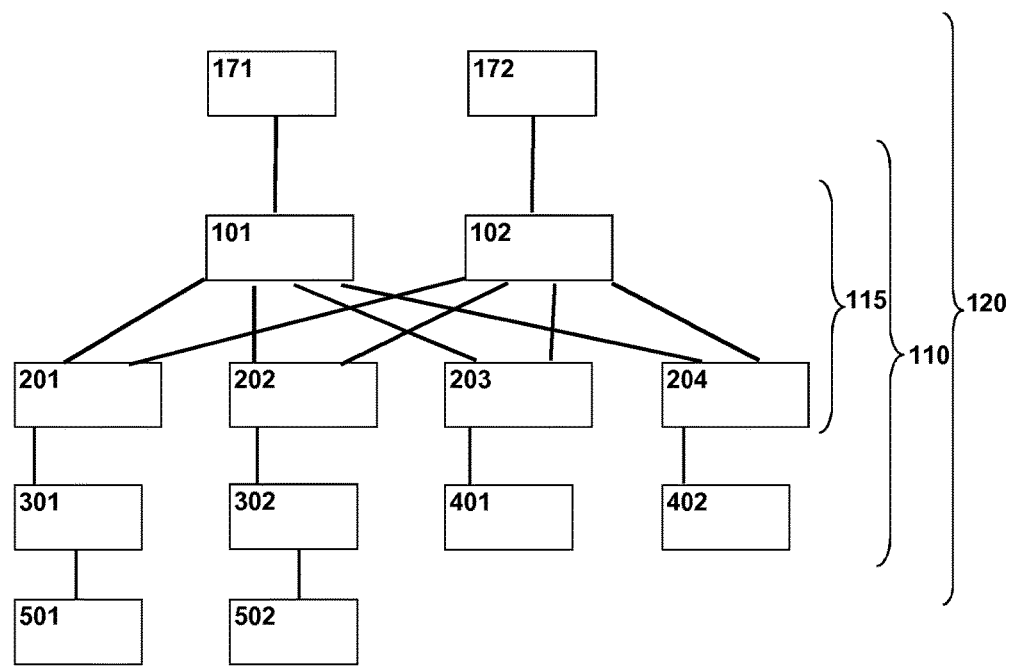
FIG. 2 schematically illustrates a part of the telecommunications network, wherein the represented part of the telecommunications network comprises a switching fabric within a logical or physical central office point of delivery, which itself is part of the broadband access network of the telecommunications network.

FIG. 2 schematically illustrates a part of the telecommunications network 100, wherein the represented part of the telecommunications network 100 comprises a switching fabric 115 within a logical or physical central office point of delivery 110, which itself part of the broadband access network 120 of the telecommunications network 100. The switching fabric 115 comprises a plurality of spine network nodes. In the example represented in FIG. 2, the switching fabric 115 comprises two spine network nodes, a first spine network node 101 and a second spine network node 102. Furthermore, the switching fabric 115 comprises a plurality of leaf network nodes. In the example represented in FIGS. 2 and 3, the switching fabric 115 comprises four leaf network nodes, a first leaf network node 201, a second leaf network node 202, a third leaf network node 203, and a fourth leaf network node 204. Within the switching fabric 115 each one of the plurality of spine network nodes 101, 102 is connected with each one of the plurality of leaf network nodes 201, 202, 203, 204. In addition, the broadband access network 120 typically comprises a plurality of hierarchically higher network nodes, such as, e.g. (label) edge nodes 171, 172, two of which are represented in FIG. 2. The spine network nodes 101, 102 are each connected to one of the hierarchically higher network nodes or (label) edge nodes 171, 172; in the example provided in FIG. 2, there is a 1:1 relationship between each one of the spine network nodes 101, 102 on the one hand, and each one of the hierarchically higher network nodes or (label) edge nodes 171, 172 on the other hand. However, according to the present invention, such a 1:1 relationship is not mandatory: It is preferred according to the present invention to realize that broadband access network such that a group or a plurality of at least two spine network nodes 101, 102 and a group or a plurality of at least two hierarchically higher network nodes or (label) edge nodes 171, 172 are related or assigned to each other, but that the effective connection between a specific spine network node (of the considered group of spine network nodes) and a specific (label) edge node (of the considered group of (label) edge nodes) is dependent on the required transmission capacity in different load conditions of the network.

The central office point of delivery 110 furthermore comprises a plurality of line termination nodes and a plurality of service edge nodes. In the example represented in FIG. 2, the central office point of delivery 110 comprises two line termination nodes, including a first line termination node 301 and a second line termination node 302, and two service edge nodes (e.g. BNG (Broadband Network Gateway) nodes), including a first service edge node 401 and a second service edge node 402. Furthermore, either as part of the broadband access network 120 or connected to the broadband access network 120, a plurality of customer premises equipments 501, 502 is shown in FIG. 2. It is schematically shown in FIG. 2 that each one of the plurality of line termination nodes 301, 302 is connected to at least one of the plurality of customer premises equipments 501, 502. In the example represented in FIG. 2, two customer premises equipments, a first customer premises equipment 501, and a second customer premises equipment 502 are schematically shown.

Figure 3:
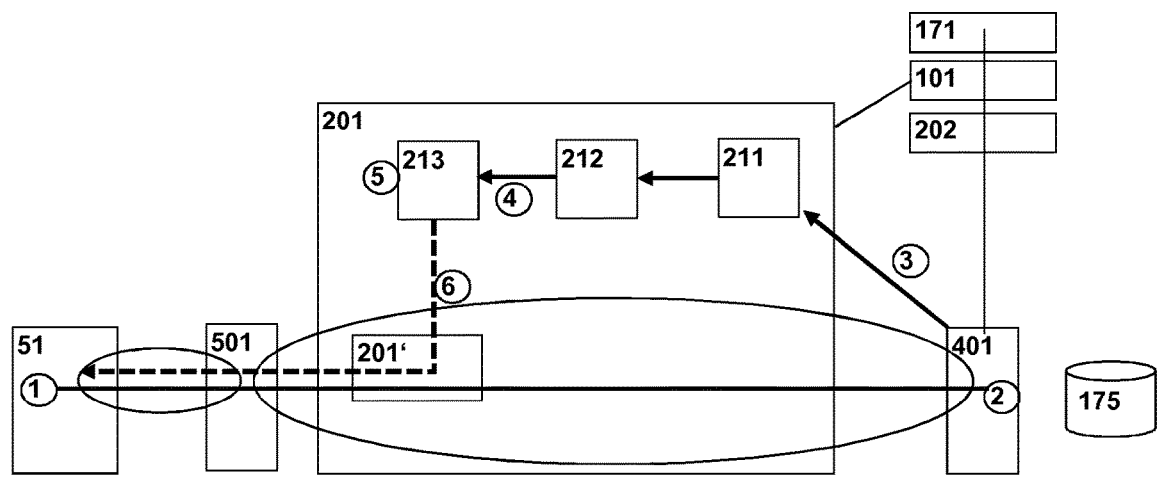
FIG. 3 schematically illustrates an example of the handling of unicast traffic and multicast traffic using a point-to-point-protocol connection (or a tunneling protocol connection) between a service edge node, on the one hand, and, on the other hand, a customer premises equipment (or a client device connected to the customer premises equipment), wherein the replication of multicast data stream-related data packets is offloaded to a multicast controller node.

In FIG. 3, an example of the handling of unicast traffic and multicast traffic using a point-to-point-protocol connection (or a tunneling protocol connection) between a (specific) service edge node 401, on the one hand, and, on the other hand, a (specific) customer premises equipment 501 (or a client device 51 connected to the customer premises equipment 501) is schematically shown, wherein the replication of multicast data stream-related data packets is offloaded to a multicast controller node 201.

According to the present invention, an enhanced handling of multicast data streams is possible to achieve within a broadband access network 120 of a telecommunications network 100. The broadband access network 120 comprises a plurality of service edge nodes 401, 402 to be connected to customer premises equipments 501, 502 (or to integrated access devices). The customer premises equipments 501, 502 (or integrated access devices) are provided to be connected to the broadband access network 120 in view of handling both unicast traffic and multicast data streams between the customer premises equipments 501, 502 and the (respective nodes of the) broadband access network 120.

In view of transmitting unicast traffic-related data packets, a specific (or first) service edge node 401 and a specific (or first) customer premises equipment 501 (or specific or first integrated access device) is considered. In a conventionally known manner, a point-to-point-protocol connection (or a tunneling protocol connection) is established between the specific service edge node 401 and the specific customer premises equipment 501. A session identifier information is assigned to this point-to-point-protocol connection (or the tunneling protocol connection).

In case that a multicast data stream, comprising multicast data stream-related data packets, is to be transmitted to the specific customer premises equipment 501 (typically upon a request, received by the specific customer premises equipment 501, from a client device 51 connected to the specific customer premises equipment 501)—these multicast data stream-related data packets being transmitted in addition (i.e. in parallel or during the same time period) to the transmission of unicast stream-related data packets—, the following steps are conducted according to an exemplary embodiment of the present invention:

in a first step, the specific service edge node 401 receives a join request message from or through the specific customer premises equipment 501 (i.e. in case that the join request message is initially triggered by the corresponding client device 51, the join request message is forwarded by the specific customer premises equipment 501 to the specific service edge node 401), in a second step subsequent to the first step, an activation request message is transmitted, by the specific service edge node 401, to a multicast controller node 201 within the broadband access network 120, wherein via the activation request message, at least part of the join request message is forwarded to the multicast controller node 201 together with the session identifier information of the point-to-point-protocol connection (or the tunneling protocol connection) being established between the specific service edge node 401 and the specific customer premises equipment 501, in a third step subsequent to the second step, the multicast controller node 201 generates and/or replicates the multicast data stream-related data packets and injects these multicast data stream-related data packets, using the corresponding session identifier information, into the existing point-to-point-protocol connection (or the tunneling protocol connection) between the specific service edge node 401 and the specific customer premises equipment 501.

Hence, according to the present invention, the multicast signaling attachment point (i.e. in the example considered the specific service edge node 401) and the multicast data plane replication point (i.e. in the example considered the multicast controller node 201) are separated. Although the unicast traffic is still terminated on the specific service edge node 401 (or the broadband network gateway (BNG) entity), the multicast replication will be offloaded to the multicast controller node 201, such as a top of rack (TOR) switch. One of the advantages of such a solution according to the present invention is that a single virtual local area network (VLAN) deployment model can be used, i.e. both the unicast traffic and multicast data stream are still transported within the same point-to-point-protocol connection and/or session (or tunneling protocol connection and/or session).

Generally, in order to receive multicast data packets, a broadband subscriber (i.e. a customer premises equipment 501, 502 or integrated access device and/or a client device connected to such a customer premises equipment) sends an Internet Group Management Protocol (IGMP) signaling request to the service edge node 401, 402 (or broadband network gateway device). Today, the BNG itself joins all available multicast streams for improved user experience.

In conventionally known telecommunications networks 100 or broadband access networks 120, such service edge nodes 401, 402 (or broadband network gateway devices) would join all available multicast streams for improved user experience (of all customer premises equipments 501, 502 and/or all customers or client devices connected). Therefore, such service edge nodes 401, 402 (or broadband network gateway devices) would send join messages (or protocol independent multicast (PIM) join messages) towards the source of the multicast data stream (such as either the spine network nodes 101, 102 or the (label) edge nodes 171, 172, or another network node of the telecommunications network 100, serving as multicast source). As a result, the corresponding leaf switches, spine switches and/or other network nodes in a CORD-like architecture (i.e. typically the hierarchically higher network nodes) will (need to) join those multicast groups as well, hence resulting in a multicast replication tree in conventionally known telecommunications network 100.

According to the present invention, it is advantageously possible to offload the (user plane related) multicast traffic from the service edge nodes 401, 402 (e.g., realized in the form of virtual broadband network gateway (vBNG) devices). This is realized via the service edge nodes 401, 402 (or (virtual) broadband network gateway devices)—upon reception of the (IGMP) join request (corresponding to the join request message from or through the customer premises equipments 501, 502)—forwards this request (either identically or in a more or less modified manner and/or either directly or indirectly—this request corresponding to the activation request message) to a controller device (corresponding to the multicast controller node 201, this multicast controller node 201 being realized, for example, via (as represented in FIG. 3) the corresponding leaf switch of the corresponding service edge node 401, 402) for further processing. The request (corresponding to the activation request message) forwarded by the controller device (i.e. the multicast controller node 201) is forwarded by a well-defined application programming interface (API) such as REST or Netconf. This control message (i.e. the activation request message) also includes the PPP session ID (i.e. the session identifier information of the point-to-point-protocol connection or of the tunneling protocol connection) as an additional attribute. In contrast to the handling and replication of multicast data stream-related data packets in conventionally known telecommunications networks 100 (as mentioned in the previous paragraph), the service edge nodes 401, 402 (or (virtual) broadband network gateway devices) do not generate PIM Join messages, i.e. native join messages, towards the backbone network nodes nor conduct any programming of any kind of multicast replication state into their own forwarding tables—this user plane replication efforts being offloaded and being handled by the corresponding multicast controller node 201.

Due to the fact that there is typically a whitelist for allowed multicast streams per subscriber (i.e. per customer premises equipment 501, 502) and a need to perform traffic shaping for the combined multicast and unicast traffic, both unicast and multicast traffic need to be merged at some point in the network. As, according to the present invention, the service edge nodes 401, 402 (or (virtual broadband network gateway ((v)BNG) devices are no longer within the multicast distribution (and/or replication) chain (of network nodes), this merge point needs to be set at another network node, such as the (corresponding) leaf switch, i.e. the multicast controller node 201.

The leaf switch (or multicast controller node 201) joins all multicast groups. Upon receipt of a well-defined control frame (i.e. the activation request message) from the service edge node (or broadband network gateway (BNG) or any other controller device), the multicast traffic is replicated on the leaf switch (i.e. the multicast controller node 201) and injected into the point-to-point-protocol connection (or the tunneling protocol connection) of the subscriber or customer premises equipment 501, 502. As the point-to-point-protocol is a comparatively simple protocol, those point-to-point-protocol frames (or data packets) can easily be generated on the leaf switch, i.e. on the multicast controller node 201. The mapping between the subscriber and the corresponding multicast stream is preferably done based on the point-to-point-protocol session ID, i.e. the session identifier information of the point-to-point-protocol connection (or the tunneling protocol connection). As multicast traffic is sent from the multicast source to receivers, the traffic is typically unidirectional. Other than the point-to-point-protocol session ID processing (i.e. taking into consideration the session identifier information), the leaf switch (or multicast controller node 201) only needs to calculate (in case of using a point-to-point-protocol connection) the point-to-point-protocol checksum in order to generate the point-to-point-protocol frame; in case that a tunneling protocol connection is used, typically a corresponding checksum or an analogous mechanism is used. There is no further stateful processing necessary.

As the leaf switch itself (i.e. the multicast controller node 201) replicates the multicast packets and also forwards the unicast traffic encapsulated into the point-to-point-protocol connection (or the tunneling protocol connection) as a transit node at the same time, the leaf switch (i.e. the multicast controller node 201) is aware of the combined unicast and multicast traffic which allows to implement shaping and additional quality-of-service functionality. Basically, the service edge node 401, 402 (or (virtual) broadband network gateway device) can perform shaping on the unicast traffic based on the total subscriber bandwidth reduced by the multicast traffic (bandwidth). This information can be provided by a policy framework (e.g., RADIUS server 175), and depends on the number of subscribed channels and the bandwidth per multicast channel.

In FIG. 3, different processing steps are indicated via encircled reference signs. A first processing step 1 corresponds to the client device 51 requesting a multicast stream. A corresponding request message (i.e. the join request message from or through the specific customer premises equipment 501) is transported via the customer premises equipment 501 to the service edge node 401. In the second processing step 2, the service edge node 401 receives the join request message and checks its validity; in case that the corresponding customer is allowed to receive the requested multicast data stream, the third processing step 3 is invoked, corresponding to the service edge node 401 sending or transmitting the activation request message to the multicast controller node 201, such as to an activation point 211 and according to an application programming interface, such as REST. Typically, the multicast controller node 201 receives the different (or all) multicast streams, hence, the specific multicast stream (requested by the customer premises equipment 501 or by the corresponding client device 51) is triggered to be replicated by the multicast controller node 201 in a fourth processing step 4. Prior to being injected into the corresponding point-to-point-protocol connection (or tunneling protocol connection), the multicast data stream is encapsulated—in a fifth processing step 5 and at a corresponding point 213 or node—according to the respective protocol used (i.e. point-to-point-protocol encapsulation in case that a point-to-point-protocol connection is used; a different encapsulation in case that another (e.g., tunneling) protocol is used); the fifth processing step 5 corresponding to opening (or complementing) the communication pipe or communication tunnel (established for the transport of unicast traffic between the specific customer premises equipment 501 (or a connected client device) on the one hand, and the specific service edge node 401 on the other hand) in view of additionally injecting (at a multicast injection point 201'), in this established communication pipe or tunnel, the data packets of the multicast data stream requested by the join request message from or through the specific customer premises equipment 501. In a sixth processing step 6, the multicast stream is transmitted, as part of the communication pipe or tunnel (i.e. as part of the point-to-point-protocol connection or as part of the tunneling protocol connection) to the customer premises equipment 501 and/or the corresponding client device 51.

Hence, according to the present invention, the following is realized: A mechanism for flexible multicast injection into an existing communication pipe or communication tunnel (e.g., a point-to-point-protocol stream) within software defined network or cord based (SDN/Cord based) architectures, wherein the multicast controller node 201 is, for instance, located on the corresponding leaf switch (or on an arbitrary leaf switch). In particular, this results in physical separation of the multicast injection point 201' and unicast forwarding point (i.e. the service edge node 401, 402) within the network. Separation of multicast control signaling and multicast data plane, i.e. the entity that processes the multicast requests and the entity that actually performs the replication is separated. According to the present invention, the control plane of one device (service edge node 401, 402) and the data plane of another device (multicast controller node 201) are used. Injection of multicast data packets in an existing communication pipe or tunnel context (e.g., a point-to-point-protocol session or connection or another tunneling protocol connection) outside of that communication pipe or tunnel and outside of its subscriber termination point in a single VLAN allowing to maintain existing access deployment models.

As a result, the present invention allows for a controller and session-based enabling/disabling of the multicast injection point.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling of multicast data streams within a broadband access network of a telecommunications network, wherein the broadband access network comprises a plurality of service edge nodes to be connected to customer premises equipments, the customer premises equipments being provided to be connected to the broadband access network for handling both unicast traffic and multicast data streams between the customer premises equipments and the broadband access network, wherein, for transmitting unicast traffic-related data packets between a specific service edge node and a specific customer premises equipment, a point-to-point-protocol connection or a tunneling protocol connection is established between the specific service edge node and the specific customer premises equipment, the point-to-point-protocol connection or the tunneling protocol connection having an assigned session identifier information, wherein—in case that a multicast data stream, comprising multicast data stream-related data packets, is to be transmitted to the specific customer premises equipment—the method comprises:

in a first step, the specific service edge node receives a join request message from or through the specific customer premises equipment;

in a second step subsequent to the first step, an activation request message is transmitted, by the specific service edge node, to a multicast controller node within the broadband access network, wherein via the activation request message, at least part of the join request message is forwarded to the multicast controller node together with the session identifier information of the point-to-point-protocol connection or the tunneling protocol connection between the specific service edge node and the specific customer premises equipment; and in a third step subsequent to the second step, the multicast controller node generates and/or replicates the multicast data stream-related data packets and injects these multicast data stream-related data packets, using the corresponding session identifier information, into the point-to-point-protocol connection or the tunneling protocol connection between the specific service edge node and the specific customer premises equipment.

2. The method according to claim 1, wherein between the unicast traffic of the specific customer premises equipment, on the one hand, and, the multicast data stream towards the specific customer premises equipment, on the other hand, a mapping of the multicast data stream-related data packets and the unicast traffic-related data packets is realized based on the session identifier information.

3. The method according to claim 1, wherein both the multicast data stream-related data packets and the unicast traffic-related data packets, while logically sharing the same point-to-point-protocol connection or the same tunneling protocol connection using only one virtual local area network, only partly share the same physical data path.

4. The method according to claim 3, wherein the multicast injection point is physically separated from the service edge node, acting as a forwarding point within the telecommunications network of the multicast traffic of or for the specific customer premises equipment.

5. The method according to claim 1, wherein, in order to perform traffic shaping of the unicast traffic-related data packets between the specific service edge node and the specific customer premises equipment, the multicast controller node provides information regarding the bandwidth used by the multicast data stream to the specific service edge node.

6. The method according to claim 1, wherein multicast replication of the multicast data stream-related data packets is carried out exclusively at the multicast controller node, and transmission of native join messages or native join requests is exclusively carried out between the specific customer premises equipment and the specific service edge node.

7. The method according to claim 1, wherein the broadband access network comprises a switching fabric within a central office point of delivery, wherein the switching fabric comprises a plurality of spine network nodes and a plurality of leaf network nodes, wherein the multicast controller node corresponds to a leaf network node of the plurality of leaf network nodes;
wherein—within the switching fabric—each one of the plurality of spine network nodes is connected with each one of the plurality of leaf network nodes.

8. The method according to claim 7, wherein the broadband access network comprises a plurality of line termination nodes.

9. The method according to claim 8, wherein a specific line termination node is part of the point-to-point-protocol connection or the tunneling protocol connection between the specific service edge node and the specific customer premises equipment.

10. The method according to claim 1, wherein the multicast data stream-related data packets are injected into the point-to-point-protocol connection or the tunneling protocol connection at a multicast injection point.

11. The method according to claim 10, wherein the multicast injection point is located within the multicast controller node.

12. A telecommunications network for handling of multicast data streams within a broadband access network of the telecommunications network, wherein the broadband access network comprises a plurality of service edge nodes to be connected to customer premises equipments, the customer premises equipments being provided to be connected to the broadband access network for handling both unicast traffic and multicast data streams between the customer premises equipments and the broadband access network,
wherein, for transmitting unicast traffic-related data packets between a specific service edge node and a specific customer premises equipment, the telecommunication network is adapted to establish a point-to-point-protocol connection or a tunneling protocol connection between the specific service edge node and the specific customer premises equipment the point-to-point-protocol connection or the tunneling protocol connection having an assigned session identifier information, wherein—in case that a multicast data stream, comprising multicast data stream-related data packets, is to be transmitted to the specific customer premises equipment—the telecommunications network is configured such that:
the specific service edge node is adapted to receive a join request message from the specific customer premises equipment;
the specific service edge node is adapted to transmit an activation request message to a multicast controller node within the broadband access network, wherein via the activation request message, at least part of the join request message is forwarded to the multicast controller node together with the session identifier information of the point-to-point-protocol connection or the tunneling protocol connection between the specific service edge node and the specific customer premises equipment; and
the multicast controller node is adapted to generate and/or replicate the multicast data stream-related data packets and is adapted to inject these multicast data stream-related data packets, using the corresponding session identifier information, into the point-to-point-protocol connection or the tunneling protocol connection between the specific service edge node and the specific customer premises equipment.

13. A system for handling of multicast data streams within a broadband access network of a telecommunications network, the system comprising:
the telecommunications network; and
a plurality of customer premises equipments;
wherein the broadband access network comprises a plurality of service edge nodes to be connected to the customer premises equipments, the customer premises equipments being provided to be connected to the broadband access network for handling both unicast traffic and multicast data streams between the customer premises equipments and the broadband access network;
wherein, for transmitting unicast traffic-related data packets between a specific service edge node and a specific customer premises equipment, the system is adapted to establish a point-to-point-protocol connection or a tunneling protocol connection between the specific service edge node and the specific customer premises equipment, the point-to-point-protocol connection or the tunneling protocol connection having an assigned session identifier information, wherein—in case that a multicast data stream, comprising multicast data stream-related data packets, is to be transmitted to the specific customer premises equipment—the system is configured such that:
the specific service edge node is adapted to receive a join request message from the specific customer premises equipment;
the specific service edge node is adapted to transmit an activation request message to a multicast controller node within the broadband access network, wherein via the activation request message, at least part of the join request message is forwarded to the multicast controller node together with the session identifier information of the point-to-point-protocol connection or the tunneling protocol connection between the specific service edge node and the specific customer premises equipment; and
the multicast controller node is adapted to generate and/or replicate the multicast data stream-related data packets and is adapted to inject these multicast data stream-related data packets, using the corresponding session identifier information, into the point-to-point-protocol connection or the tunneling protocol connection between the specific service edge node and the specific customer premises equipment.

14. A non-transitory computer-readable medium having processor-executable instructions stored thereon, wherein the processor-executable instructions, when executed, facilitate performance of the method for handling of multicast data streams according to claim 1.

* * * * *